US 8,165,302 B2

(12) United States Patent
Pedlow, Jr.

(10) Patent No.: US 8,165,302 B2
(45) Date of Patent: Apr. 24, 2012

(54) KEY TABLE AND AUTHORIZATION TABLE MANAGEMENT

(75) Inventor: Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1145 days.

(21) Appl. No.: 11/705,189

(22) Filed: Feb. 12, 2007

(65) Prior Publication Data
US 2007/0242829 A1 Oct. 18, 2007

Related U.S. Application Data

(63) Continuation-in-part of application No. 11/348,777, filed on Feb. 7, 2006.

(60) Provisional application No. 60/688,553, filed on Jun. 7, 2005.

(51) Int. Cl.
H04L 9/00 (2006.01)
(52) U.S. Cl. ............... 380/277; 380/278; 713/171
(58) Field of Classification Search ............... 380/277; 713/171
See application file for complete search history.

(56) References Cited

U.S. PATENT DOCUMENTS

| 4,809,327 | A | 2/1989 | Shima |
| 5,237,611 | A | 8/1993 | Rasmussen et al. |
| 5,592,552 | A | 1/1997 | Fiat |
| 5,915,025 | A | 6/1999 | Taguchi et al. |
| 6,351,813 | B1 | 2/2002 | Mooney et al. |
| 6,359,986 | B1 * | 3/2002 | Tatebayashi ............... 380/277 |
| 6,742,116 | B1 * | 5/2004 | Matsui et al. ............... 713/171 |
| 6,938,162 | B1 * | 8/2005 | Nagai et al. ............... 713/189 |
| 7,043,494 | B1 * | 5/2006 | Joshi et al. ............... 1/1 |
| 7,136,488 | B2 * | 11/2006 | Hashimoto et al. ........ 380/277 |
| 7,630,498 | B2 * | 12/2009 | Noh ............... 380/281 |
| 7,631,361 | B2 * | 12/2009 | Yamamichi et al. ........ 726/27 |
| 8,073,143 | B2 * | 12/2011 | Watanabe et al. ......... 380/277 |
| 2002/0069357 | A1 * | 6/2002 | Kilkkila ............... 713/169 |

(Continued)

FOREIGN PATENT DOCUMENTS
WO WO 01/15162 3/2001
(Continued)

OTHER PUBLICATIONS

Hirai, Tatsuya, "Content Protection Technology for a Novel Removable Drive," IEEE Transactions on Magnetics, vol. 41, No. 2, Feb. 2005, pp. 860-.*

(Continued)

Primary Examiner — Luu Pham
(74) Attorney, Agent, or Firm — Miller Patent Services; Jerry A. Miller

(57) ABSTRACT

In certain embodiments, a player device that receives and plays content stored on packaged media, the player device has a media reader that receives a packaged media to read digital data stored thereon. The player device has a secure persistent storage device storing a key table containing a plurality of keys indexed by an index. A decrypter decrypts the digital data stored on the packaged media using at least one of the encryption keys referenced by a key index stored on the packaged media. A decoder decodes the decrypted digital data stored on the packaged media and provides the decoded data as an output. This abstract is not to be considered limiting, since other embodiments may deviate from the features described in this abstract.

12 Claims, 7 Drawing Sheets

U.S. PATENT DOCUMENTS

| | | | |
|---|---|---|---|
| 2002/0076204 A1* | 6/2002 | Nakano et al. | 386/94 |
| 2002/0150250 A1* | 10/2002 | Kitaya et al. | 380/277 |
| 2003/0026431 A1 | 2/2003 | Hammersmith | |
| 2003/0068047 A1 | 4/2003 | Lee et al. | |
| 2003/0105967 A1* | 6/2003 | Nam | 713/189 |
| 2003/0152235 A1 | 8/2003 | Cohen et al. | |
| 2003/0219129 A1* | 11/2003 | Whelan et al. | 380/270 |
| 2004/0062398 A1 | 4/2004 | Unger | |
| 2004/0073796 A1* | 4/2004 | Kang et al. | 713/171 |
| 2004/0162980 A1 | 8/2004 | Lesenne et al. | |
| 2005/0114689 A1* | 5/2005 | Strom et al. | 713/193 |
| 2005/0185547 A1* | 8/2005 | Nagai et al. | 369/47.55 |
| 2005/0193214 A1* | 9/2005 | Noh | 713/193 |
| 2005/0226420 A1* | 10/2005 | Makela et al. | 380/270 |
| 2006/0031873 A1* | 2/2006 | Fahrny et al. | 725/31 |
| 2006/0155989 A1* | 7/2006 | Nishimoto et al. | 713/166 |
| 2006/0159424 A1* | 7/2006 | Hu et al. | 386/94 |
| 2006/0235705 A1* | 10/2006 | Deolalikar et al. | 705/1 |
| 2006/0274898 A1 | 12/2006 | Pedlow, Jr. | |
| 2007/0162978 A1* | 7/2007 | Watanabe et al. | 726/27 |
| 2007/0176744 A1* | 8/2007 | Park et al. | 340/10.1 |
| 2008/0019528 A1* | 1/2008 | Kneissler | 380/279 |

FOREIGN PATENT DOCUMENTS

WO    WO 2006/065033    6/2006

OTHER PUBLICATIONS

International Search Report and Written Opinion, PCT/US08/01531, Jun. 25, 2008.

Supplemental European Search Report, EP 08 72 5200 dated Jan. 20, 2011 (Received Mar. 4, 2011).

\* cited by examiner

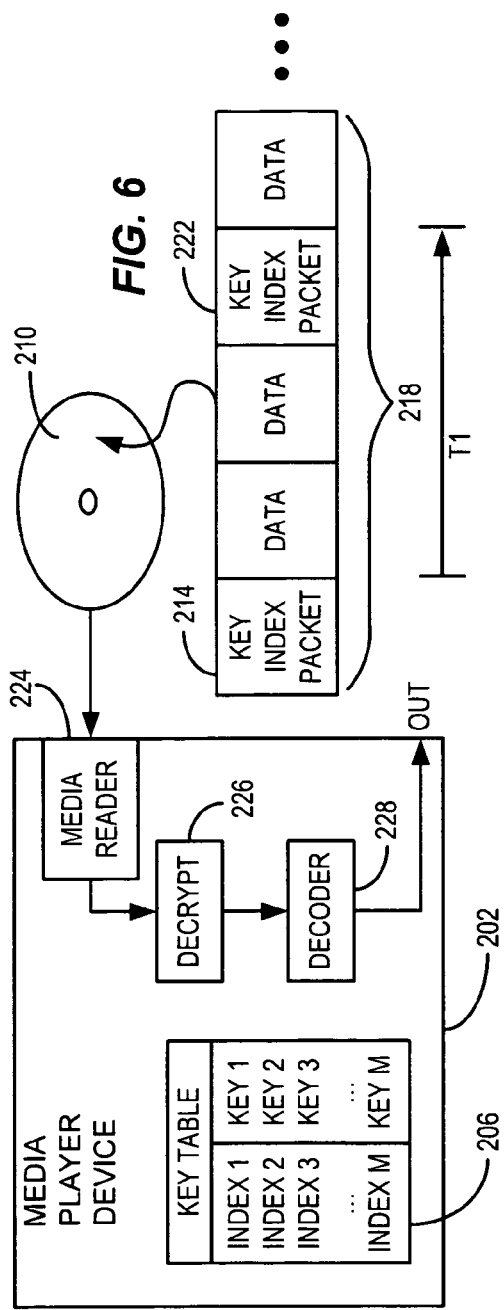
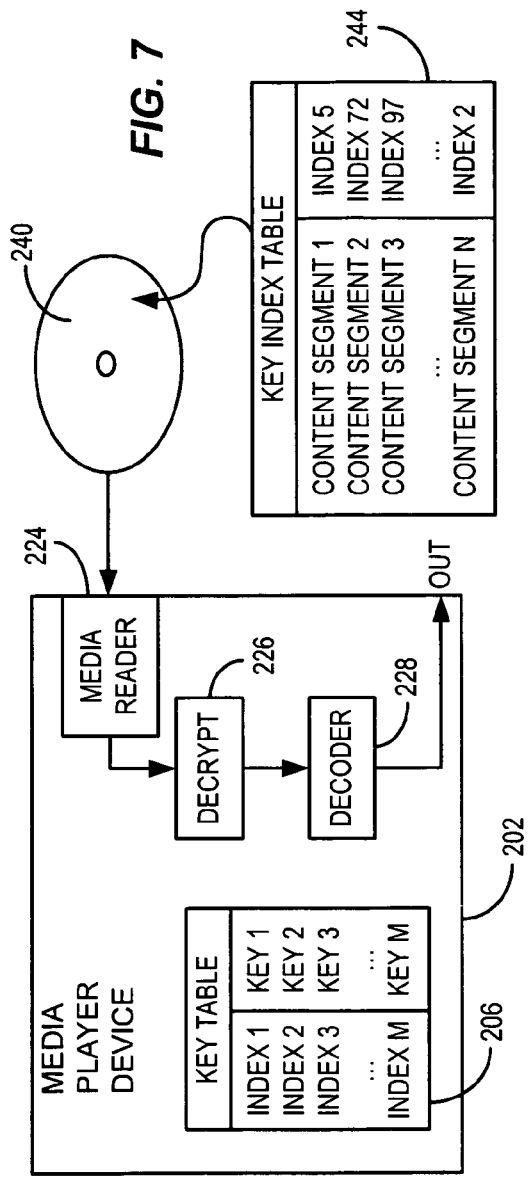

US 8,165,302 B2

KEY TABLE AND AUTHORIZATION TABLE MANAGEMENT

CROSS REFERENCE TO RELATED DOCUMENTS

This application is a continuation in part of U.S. patent application Ser. No. 11/348,777 filed Feb. 7, 2006 which claims priority benefit of U.S. provisional application No. 60/688,553 file Jun. 7, 2005, both of which are hereby incorporated herein by reference. This application also incorporates by reference SMPTE Registered Disclosure Document Number RDD 10-2006.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

In digital cable television systems, encryption is commonly used for blocking channels that have not been paid for. Those channels can generally only be accessed once an appropriate decryption key is available to the customer premise equipment (CPE; e.g., a television set-top box (STB), or properly enabled digital television set). Decryption keys are most commonly conveyed to the CPE using entitlement control messages (ECMs) that are transmitted from the network operator or an equivalent authority to the CPE. The content which is to be protected is most commonly encrypted using known algorithms such as the advanced encryption standard (AES), the DVB Common Scrambling Algorithm, the data encryption standard (DES) or its variants. Since these encryption/decryption algorithms themselves are publicly available, the key to the security of the content lies in the ability to conceal the decryption keys necessary to decrypt the content. In most subscription or pay-TV systems, the key-carrying ECMs are transmitted concurrently with the content in a single, common data transport stream.

For this reason, decryption keys transmitted via the ECM are commonly encrypted using proprietary encryption techniques. The encrypted keys are then commonly transmitted to the CPE via the ECM on an inband channel, changing on a very frequent basis in order to thwart a hacker's ability to decrypt the content based on an exhaustive trial and error key search. Unfortunately, one of the very tools used to thwart the hacker (frequent variation of the key and transmission of ECMs containing encrypted keys) provides a clue to the hacker to help crack the encryption algorithm. Each time a key is transmitted, more data is available to the hacker that can potentially be used to crack the encryption algorithm itself. Should the algorithm be cracked, the content is then unprotected, requiring costly revisions to the encryption algorithm and re-provisioning or even physical replacement of the CPE.

It is also noted that packaged media such as DVDs and the like which bear encrypted content is also subject to hacking and in fact have been hacked. This similarly results in loss of the ability to protect the content.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 6 illustrates an exemplary analogous embodiment applied to packaged media in a manner consistent with certain embodiments.

FIG. 7 Illustrates another exemplary embodiment applied to packaged media in a manner consistent with certain embodiments.

DETAILED DESCRIPTION

Figure 1:
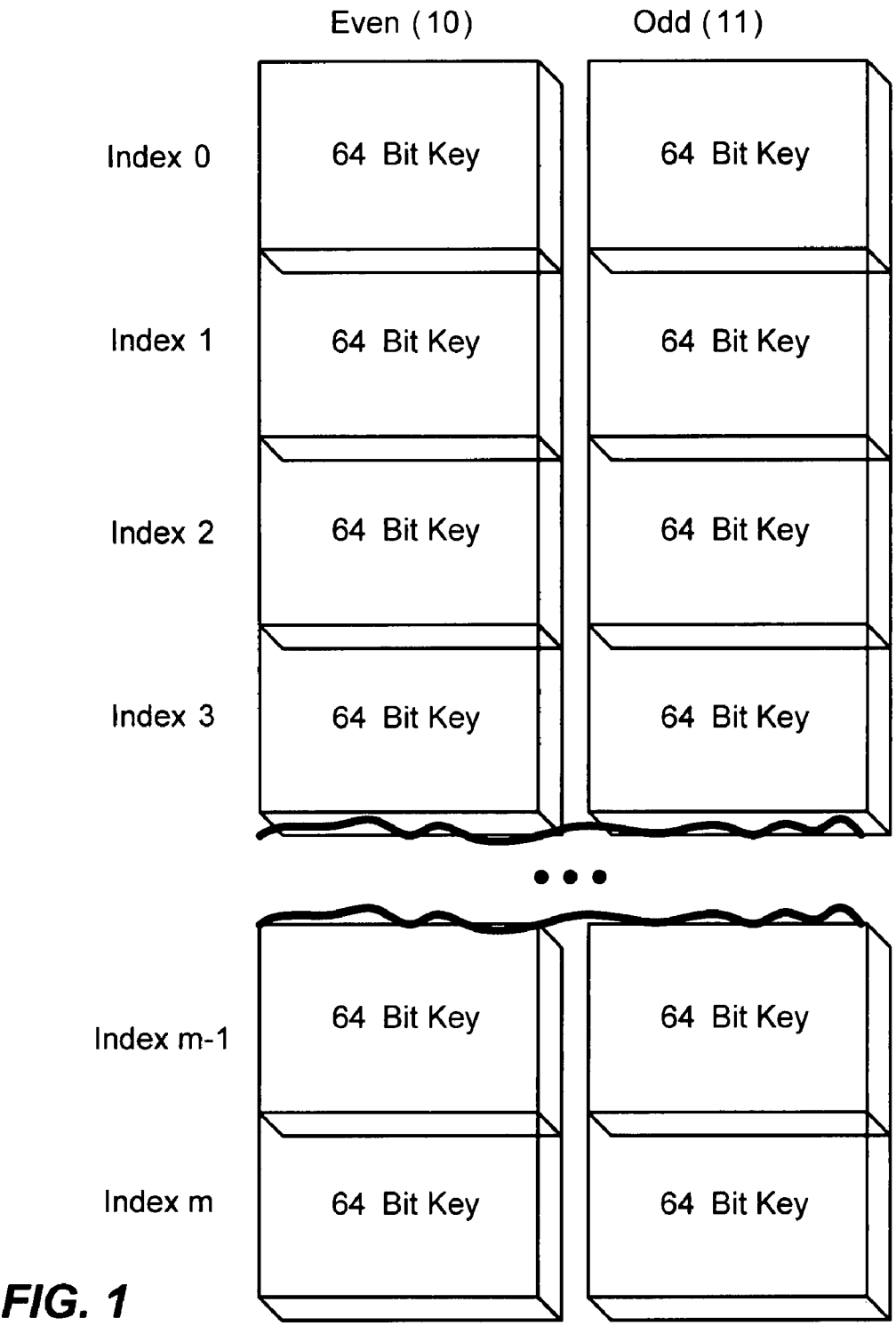
FIG. 1 is an exemplary key table consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library / dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content which would be interpreted as and reported in an electronic program guide (EPG) as a single television program, without regard for whether the content is a movie, sporting event, segment of a multi-part series, news broadcast, etc. The terms "scramble" and "encrypt" and variations thereof are used synonymously herein.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following Acronyms and Abbreviations may be used herein:
BAC Basic Access Control
BAT Bouquet Association Table
CA Conditional Access
CAS Conditional Access System
CASID Conditional Access System Identifier
CMTS Cable Modem Termination System
CPE Customer Premises Equipment
DOCSIS Data Over Cable System Interface Specification
DVB Digital Video Broadcast
ECM Entitlement Control Message
EMM Entitlement Management Message
IC Integrated Circuit
MPEG Moving Pictures Experts Group
MVPD Multichannel Video Program Distributor
MSO Multiple System Operator
NIT Network Information Table
NTS Network ID, Transport ID and Service ID
NTSC National Television Standards Committee
OSD On-Screen Display
PAT Program Allocation Table
PID Packet Identifier
PMT Program Map Table
PPV Pay-per-View
PSI Program Specific Information
QAM Quadrature Amplitude Modulation
SI Service Information In order to reduce the exposure of keys in a cable or satellite television system, and in order to significantly simplify the complexity of the management system at both the transmission point and in the customer premises equipment, a content key management system is provided in accordance with certain embodiments consistent with the present invention.

A content key management structure consistent with certain embodiments for a basic access control subsystem is for use in a digital cable or satellite television system, which augments or preferably, replaces the analog services on the existing plant with the digital equivalent of each analog service.

In traditional CA systems, key epochs are commonly on the order of milliseconds, seconds or minutes. The basic access control system provides for dynamic replacement of the content keys used to encrypt/decrypt, with a key epoch that may be significantly longer (on the order of days, weeks or months—if ever) than that used in a traditional CA system, but without the complexity, costs and additional messaging systems associated with those systems. Key delivery and CPE authorization is performed through the delivery of an entitlement management message (EMM), delivered through both (or either) DOCSIS (out of band delivery), for two-way devices, and in-band for supporting one-way devices.

In one embodiment the basic access control schema employed uses at least one key pair per service tier. Service tiers are groups of individual logical channels associated with services that are bundled as a discrete entity ("a package"). This methodology is extensible to support service tiers of any size, including single programs, such as individual events. Access to a particular service tier is determined by whether a supported CPE device has possession of the appropriate service tier key(s). To maintain message security, all EMMs are signed by the network operator's private key so that the received message may be authenticated by the CPE device.

FIG. 1 depicts a set of keys for encrypted content that are stored in the CPE (e.g., a television set-top box) in nonvolatile memory in a secure manner (e.g., using hardware protection against accessing memory containing the keys). U.S. Patent publication number US2002/0196939 to Unger, et al. describes an exemplary television set-top box hardware and software that carries out multiple selective decryption. This is an example of a CPE device that can be suitably modified to carry out processes consistent with certain embodiments of the present invention. This publication is hereby incorporated by reference.

The content keys are stored in secure persistent memory and organized as an array or table 12 that constitutes a key library. This library can be accessed by hardware such as a programmed processor within the CPE as needed. One arrangement for such a key library is shown in FIG. 1. The keys in this example are arranged in m+1 pairs, for use in the decryption process, with members of the pair being referred to as either odd keys 14 or even keys 18. In one example, which should not be considered limiting, the keys are 64 bits in length, but 128 bits or any other suitable key length can be used. Each of the m+1 pairs of keys are indexed with an address reference (which could be a memory address, an actual key number, a name, a key identifier or a memory offset, for example).

An exemplary structure for the array is as follows:

```
UINT16      key_index;
BOOLEAN     key_phase;
UINT64      content_key[key_index, 2];
if (transport_scrambling_control == '10')
    key_phase = 0;
else
    if ((transport_scrambling_control == '11')
        key_phase = 1;
```

The maximum possible storage requirement for this example key structure if it contains every possible 64 bit key is 1 MByte. It is unlikely that a system would currently have need for 65,536 unique keys (32,768 unique key pairs), but in the future, it is possible that even more key pairs and keys of greater length may be used. It is, however, anticipated that for cable and satellite applications, at least 16,777,216 unique keys (8,388,608 unique key pairs) is preferred at a minimum. Also, multiple logical channels may be mapped to the same actual key value without departing from embodiments consistent with this invention. The same content key can be used for both audio and video elements of a particular service, but other variations are also possible.

Figure 2:
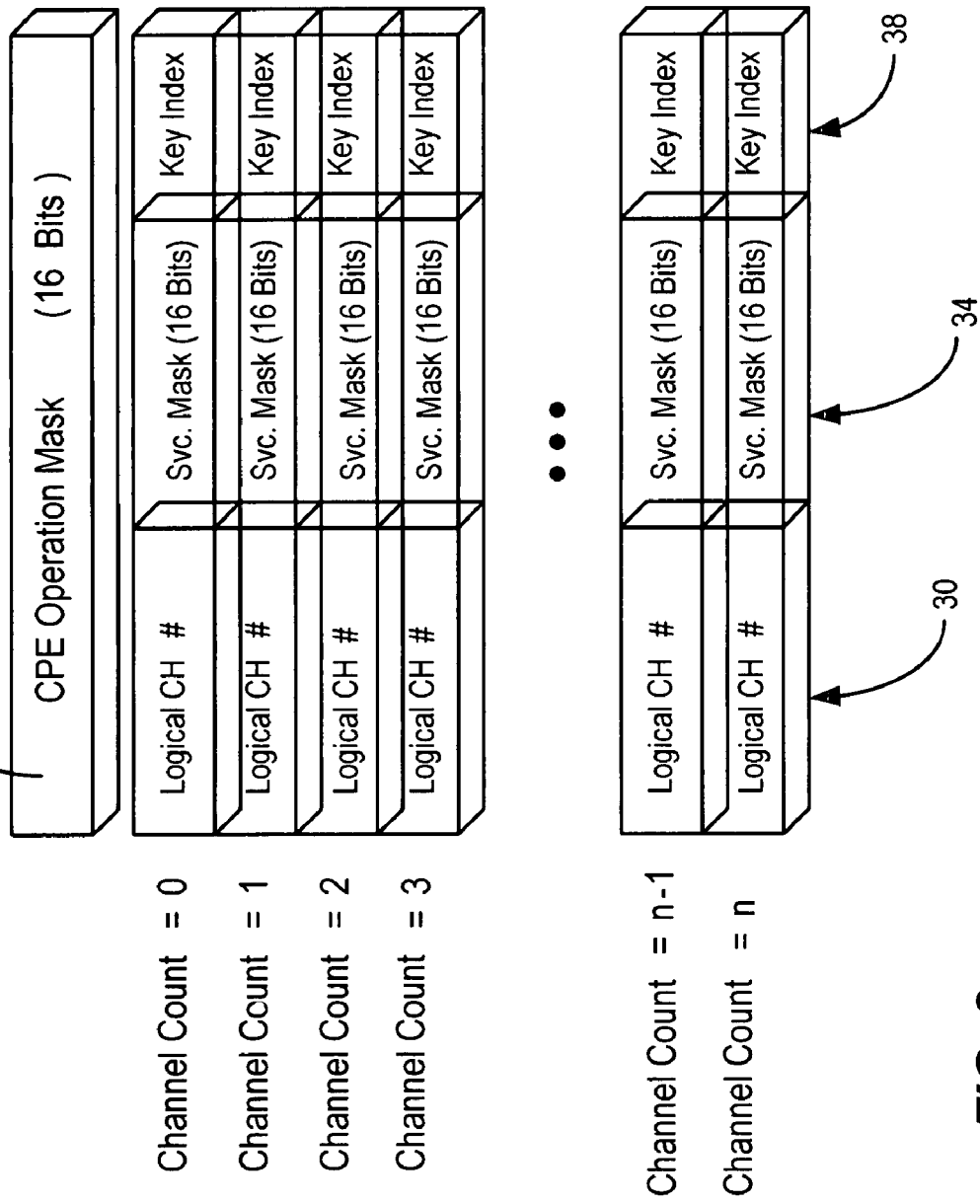
FIG. 2 is an exemplary authorization table consistent with certain embodiments of the present invention.

The association of a particular key pair (even & odd phase) to a specific service is done through data contained in the table delivered through the program authorization descriptor, mapping a logical channel to a key_index value, which is then used to find the corresponding content key pair in the content key table 12. This information is contained in an Authorization Table 22 as depicted in FIG. 2. Other embodiments may contain multiple instances of key and authorization tables, each pair of which corresponds to different networks, such as different MVPDs (e.g. different cable providers, satellite providers and telephone system operators) provided speculatively for networks that the client device may at some point be attached to. The authorization table 22 also contains a CPE Operation Mask 26 which determines global features that a particular CPE is to have enabled or disabled while operating on the network (e.g., reset, etc.). For each logical channel 0-n at 30, there is a service mask 34, which determines which channels a particular user is authorized to access as well as operational attributes (such as activation of anti-taping controls, etc.) to be associated with a particular service, and a key index 38 that associates each channel with a key pair which is designated for use in decrypting the channel. The authorization table 22 containing the list of logical channels and the associated key indices is also securely stored, as with the key table 12, in nonvolatile memory within the CPE.

Figure 3:
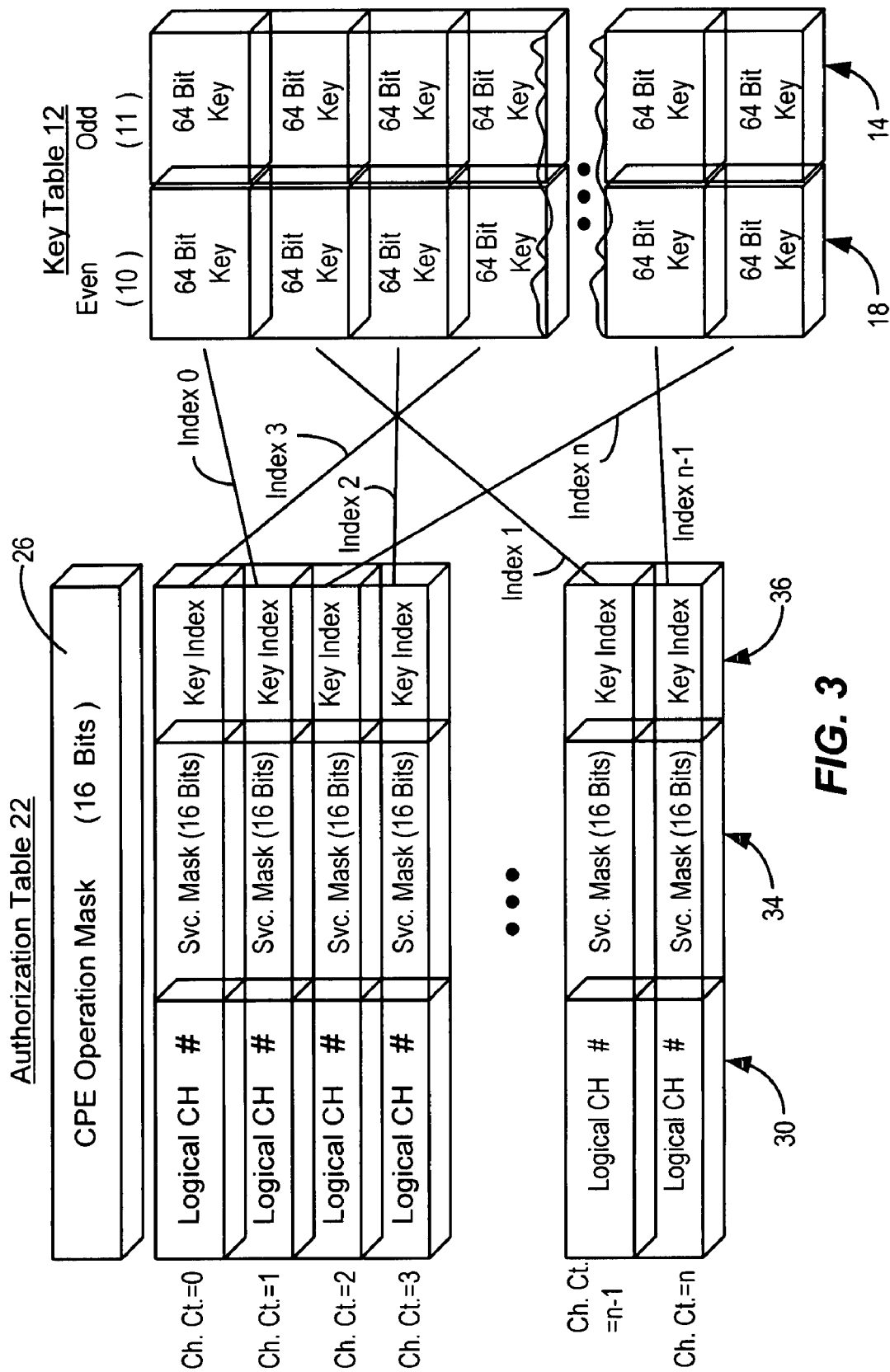
FIG. 3 illustrates the relationship between the exemplary key table and the exemplary authorization table in a manner consistent with certain embodiments of the present invention.

The relationship between the key table 12 and the authorization table 22 is illustrated in FIG. 3. In this example, logical channels are currently mapped to the key table entries in accordance with the following TABLE 1:

TABLE 1

| Logical Channel | Key index |
|---|---|
| 0 | 3 |
| 1 | 0 |
| 2 | m |
| 3 | 2 |
| ... | ... |
| n-1 | m-1 |
| N | m |

By mapping a pair of keys stored in the key table 12 to an index to the keys by channel in authorization table 22, the key for a particular channel or program can be changed by simply sending an index to the CPE associated with the channel. In this manner, the working key for a particular service or group of services can be changed without any risk that it be exposed through transmission of the key itself by merely sending a new array of key indices via EMM.

Content key delivery can be performed through use of an EMM containing a valid key data descriptor. Content key data is organized as shown in FIG. 1 as a key table 12 containing the pair of content key values covering both MPEG encryption phases (even and odd). In non-MPEG embodiments, pairs of keys may also be advantageous, but should not be considered limiting. These content key pairs are associated with an index identifying a particular content key pair. The key data descriptor structure allows for the en masse replacement of an entire column (even or odd) of content keys in the table associated with a particular encryption phase. In accordance with certain embodiments, a single descriptor cannot replace both the content keys in a particular key pair. Two independent EMM messages are separately sent to populate or refresh the entire content key table 12, one identified as associated with the even encryption phase and then one identified as associated with the odd encryption phase. In other embodiments, only selected key pairs or individual keys might be provided in the EMM without limitation. The order of these messages is unimportant.

Additionally, an optional element may be employed to increase the level of indirection in transmitted data. The key index descriptor allows the key index to be transmitted separately from the program authorization table 22 and the key data tables 12. This descriptor is used to overwrite index data in the program authorization table 22 and can be used to initially provision index data separately or to re-key a system solely through transmission of new indices without transmitting key data or program authorization tables 22. The EMM carrying the complete indices for a program tier would be very small compared to actual key replacement and can likely be contained in a single packet, being ⅓ the size of the authorization table and at a minimum ¼ the size of the key data table.

The CPE device should preferably never alter or modify in any way the format or contents of the data structures containing the program authorization table 22 and the key data table 12, except to apply the appropriate descriptor data from a validated EMM. The CPE device places the data received from the relevant EMM in the exact form and order into the storage structure without altering the order of entries in the table. The BAC system provides the logical channel entries in the program authorization table in a sorted fashion. Each program authorization table 22 and the key data table 12 can be transmitted in a complete form and to replace any existing table in its entirety. In other embodiments, only selected portions of each table can be transmitted.

In practice, the key data message is used to update only the future content key, which would be the keys associated with the phase opposite of the one currently being used to encrypt content. This method allows background provisioning of authorized CPEs with the content keys for the next epoch without any impact upon current device operation. That is to say for example, if the even key is currently being used, the even keys 18 can be replaced so the odd keys are undisturbed for retrieval (and vice versa).

In the illustrative embodiment, content access management is handled in the following manner with reference to FIG. 4. Channel maps are defined using a combination of two standard elements. Per the DVB architecture, all RF network resources are defined within the SI construct Network Information Table (NIT). The NIT describes the RF parameters associated with each service based upon 'NTS' criteria (Network ID, Transport ID and Service ID). The composite value for NTS is unique for every service available within the system.

The DVB structure Bouquet Association Table (BAT) provides a linkage between logical channel numbers and a specific NTS for NIT lookup and determination of the necessary RF parameters to access the QAM signal carrying a desired service. There may be multiple BATs, providing multiple channel line-ups that could represent differing channel plans based upon service tier, region, etc. Each BAT has an associated bouquet ID that uniquely identifies each BAT. All CPE are assigned an applicable bouquet ID upon provisioning via EMM that indicates the possible authorized services that could potentially be accessed by a particular CPE.

By default, all CPE can use a bouquet ID of zero when no bouquet ID has been issued by the headend. There are only two cases that this case should be encountered. The first case is when a new device is connected to the system prior to the headend sending (or the CPE receiving) provisioning. The second case is when an EMM is received from the headend with an operation mask setting indicating that the CPE should be deauthorized. The process of deauthorization is defined as deleting the bouquet ID variable along with the contents of the program authorization table.

Service access is managed through the program authorization table 22 which, as previously noted, is a logical construct maintained within the nonvolatile memory of each CPE device and its contents delivered via EMMs from the headend. This table 22 contains a list of logical channels that the particular device is permitted to access, along with the key index and other data uniquely associated with each service.

The presence of a logical channel in the channel list contained within the program authorization table 22 provides an indication that the channel is a candidate for viewing on a particular CPE, but does not in itself guarantee access.

Each program authorization table 22 is transmitted via EMM to the CPE device in a complete form in the preferred embodiment to replace any existing table contents in its entirety. In this embodiment, no partial channel maps are transmitted and received table data is never appended within the CPE. In this embodiments, the EMM containing the program authorization table information will not contain the associated service and operation masks. These items are delivered by separate EMMs and are composited by the CPE onto the program authorization table 22. However, other embodiments will occur to those skilled in the art upon consideration of the present teachings.

Two other components, combined with the presence of a service's logical channel number in the program authorization table, control the ultimate determination of whether the CPE should be able to access a particular service. One component is the channel_unauthorized bit contained within the service_mask variable associated with each logical channel entry in the program authorization table 22. If this bit is set, accomplished through an EMM, then the particular channel is deauthorized and not available for viewing. The other controlling components are the CPE_deauthorized and brick_mode bits contained within the CPE operation_mask, which controls attributes for the entire CPE. It too is managed through EMM messages and is part of the program authorization table 22 structure.

Figure 4:
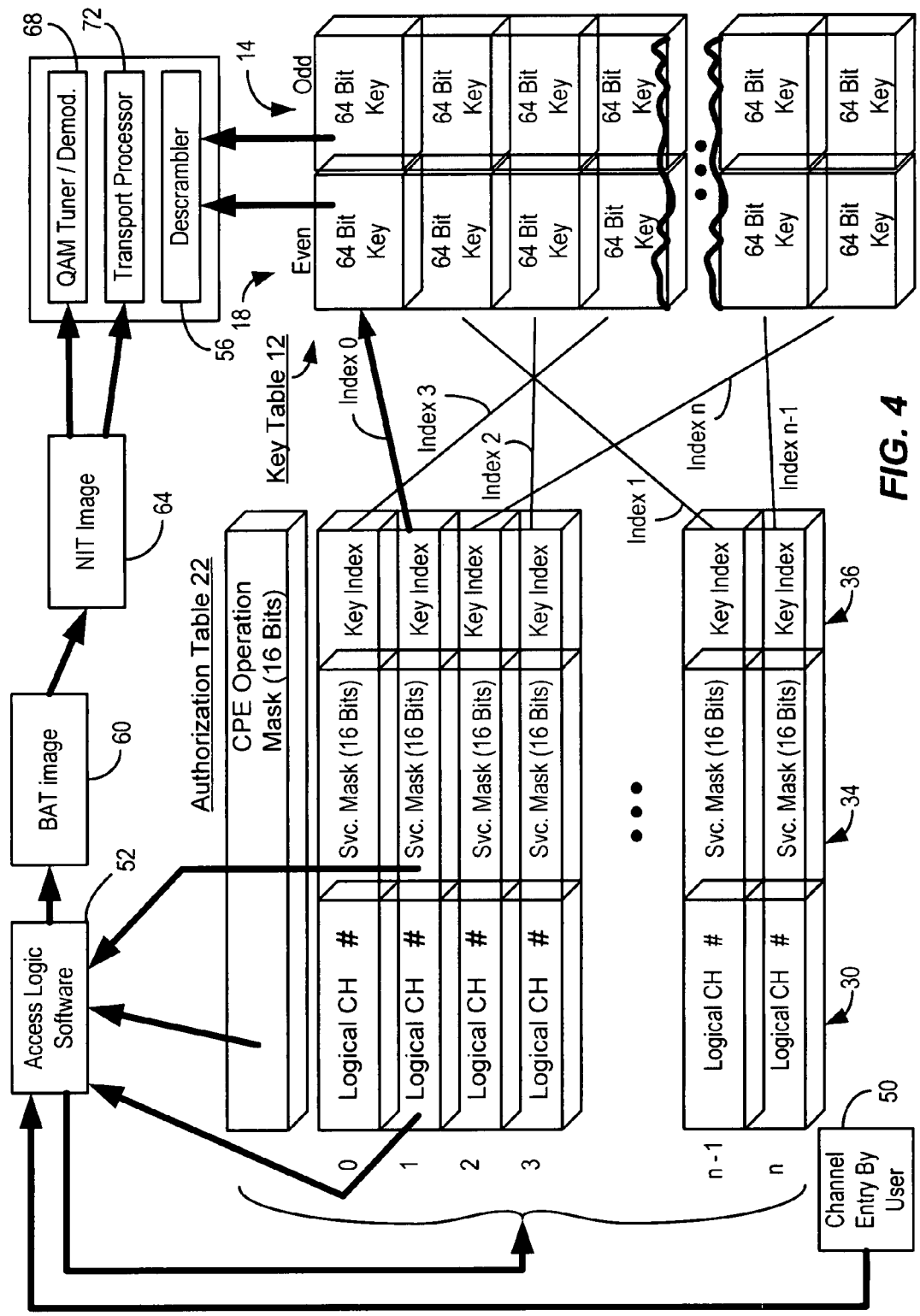
FIG. 4 illustrates a channel selection process for an encrypted channel in a manner consistent with certain embodiments of the present invention.
Figure 5:
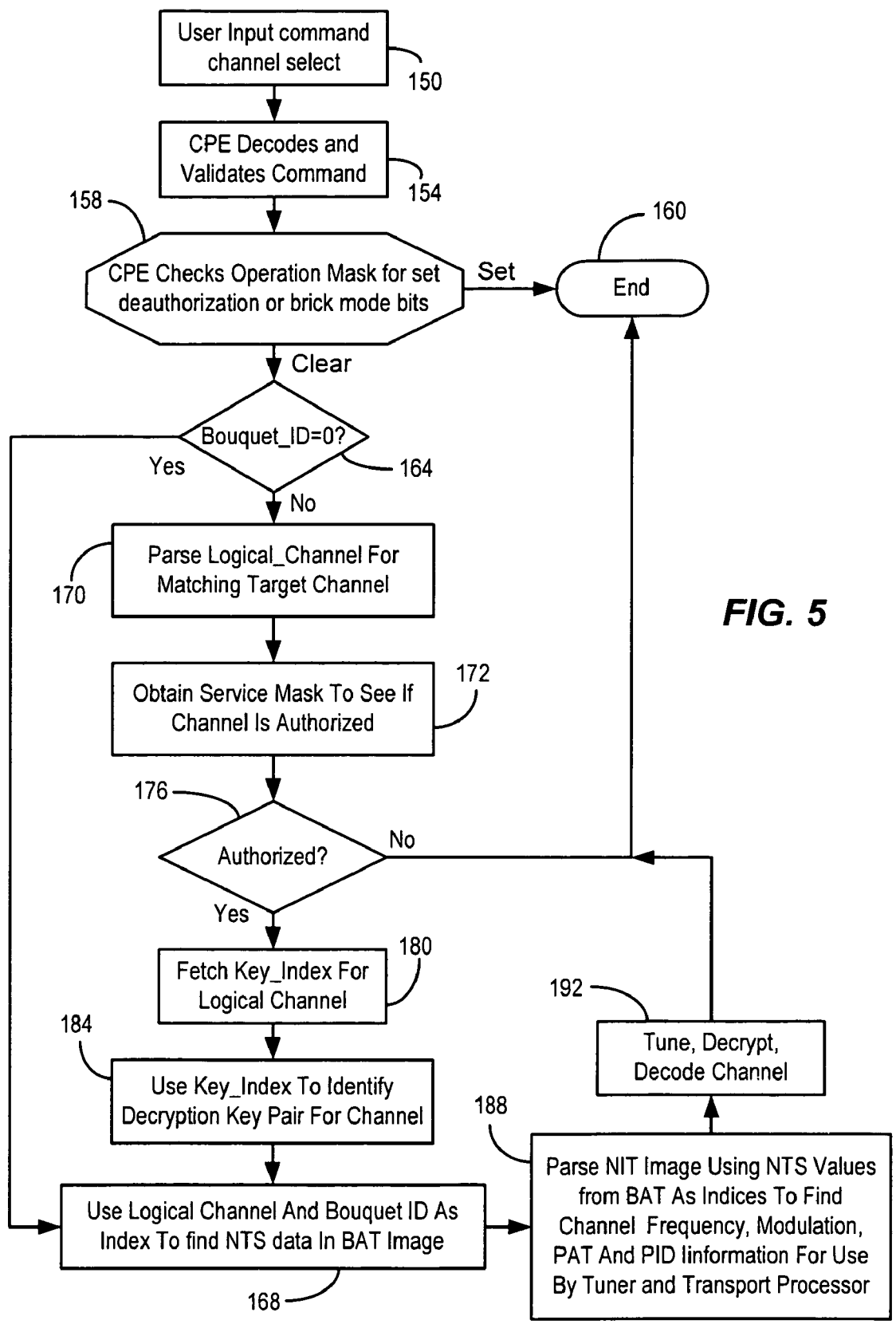
FIG. 5 is a flow chart of an exemplary process consistent with certain embodiments of the present invention.

The process of accessing a particular service is illustrated in FIG. 4 and FIG. 5 and follows the subsequent logic (referencing identifiers for both figures): A viewer indicates the desire to change decoded A/V service through their remote control or other user interface at 50 and 150. For example, this can be accomplished by a channel up/down command or a direct logical channel number entry.

1. A computer program application (Access Logic Software 52) running on the CPE receives, decodes and validates the user command at 154.
2. At 158, the CPE application checks the value of the operation_mask 26 contained within the program authorization table 22 to see if either the CPE_deauthorized or brick_mode bits are set. If the either of these bits are set, further processing of the request is ended at 160. If the bouquet_id is set to zero (default) at 164, then the process continues to 168 without further reference to the program authorization table 22 for access to free or barker channels in an unprovisioned CPE and goes directly to item 6 below. Otherwise, the process proceeds to 3 below.
3. The CPE application parses the logical_channel field of the program authorization table at 170 using the following index:
a. For channel up/down, use current channel number as the search index. When the match is found, increment or decrement one entry as appropriate to reach the entry for the target channel.
b. For direct entry, use the entered logical channel value as an index for the target channel. If the desired target channel is not contained within the table, display and appropriate OSD informing viewer.
4. From the program authorization table 22, the CPE Access Logic Software application 52 obtains the service mask field associated with the logical channel entry in the program authorization table 22 at 172 and checks to see if the channel_unauthorized bit is set at 176. If this bit is set at 176, then further processing of the request is ended at 160.

The CPE Access Logic Software application also obtains the key_index value at 180 associated with the requested service from the same record in the program authorization table containing the target logical_channel value.

5. Using the key_index value associated with the requested service, the CPE Access Logic Software application 52 accesses the key table 12 stored in nonvolatile memory at 184, using the key_index value as the array index to obtain the two 64-BIT DVB-CSA working keys used to encrypt the content. (In the example shown in FIG. 4, the key index points to keys indexed at the 0 position.) The key pair values are loaded by the CPE Access Logic Software application in the CPE transport decryption subsystem (descrambler 56) for content decryption.
6. The CPE Access Logic Software application 52 parses the BAT image 60 at 168 stored in RAM, using the logical_channel and bouquet_id values as paired indices. When the entry in the table matching both criteria is found, the associated network_id, transport_id and service_id values (referred to collectively as 'NTS') are obtained from the cached bouquet allocation table (BAT).
7. The CPE Access Logic Software application 52 next (at 188) parses the NIT image 64 stored in RAM, using the NTS values obtained from the BAT as composite indices. When the entry in the table matching all criteria is found, the associated frequency, modulation and PAT PID information are obtained from the table. The data obtained are then used by the CPE Access Logic Software application to provision the tuner and demodulator 68 and transport processor 72 subsystems to access the transport containing the requested service.

The CPE executes the tuning process and then follows the standard MPEG procedure using the service_id of the requested service and the transport PSI data tree to determine and use the respective audio and video resources of the transport multiplex to decode the desired service at 192.

The EMM format supports both unit (singular) and group messages and both the definition of and membership within a group can be arbitrarily defined. The CPE devices under BAC management are able to belong to multiple groups and each device by default belongs to two groups: itself (unit) and a global group encompassing all devices. The EMM is structured as a standard MPEG private section, containing one or more descriptors. The descriptors provide specific direction to the CPE regarding channel authorization, key delivery, software download commands, group membership, emergency alerts, etc. Regardless of number or type of descriptors contained within the EMM, each message is both encrypted using a global, fixed key and validated through a cryptographic signature.

Every known cryptographic system for cable and satellite systems has a root secret stored somewhere inside the CPE client. In traditional CA systems, this is done with either smart cards, dedicated custom ICs or through other means to create an electrically and mechanically secure environment to store the root secrets. The basic access control system does not use these extremely complex schemes nor incurs the associated hardware and licensing costs. The system contains four root secrets that are stored within the CPE. In order to compromise the system, all four must be known. The root secrets are the respective key pairs for the EMM and software download transport encryption and the keys for both the software download and EMM HMAC algorithms, respectively.

In one embodiment, the basic access control (BAC) schema uses at least one key pair per service tier. Service tiers are groups of individual logical channels associated with services that are bundled as a discrete entity ("package"). This methodology is extensible to support service tiers of any size, including single programs, such as individual events. Access to a particular service tier is determined by whether a supported CPE device has possession of the appropriate service tier key(s). To maintain message security, all EMMs are signed by the service provider's private key so that the received message may be authenticated by the CPE device.

In addition, entitlement (authorization) to individual services is determined through a service_mask, matched to each service with an authorization bit carried in the mask in an "opt-out" fashion. If a particular service bit is one in table 22, the content represented by the bit is non-authorized. The service_mask is maintained in nonvolatile memory in authorization table 22 within each supported CPE device and is locally modified through data carried in authenticated EMMs to reflect the services that a particular CPE device is intended to access. This arrangement, while reinforcing the key-per-tier schema, also allows implementation of á la carte programming. This schema also allows for the removal of programming upon a subscriber's request that they may want eliminated.

In accordance with certain embodiments, three types of keys are defined and employed: emm_key, download_key and content_key. In one particular embodiment, the emm_key is a pair of 64-bit values that are fixed and used to decrypt all DVB-CSA encrypted EMM messages received by the CPE, though any appropriate key length and encryption algorithm may be employed. This key has the same value for all CPE devices. These emm_key values are permanently stored in the CPE in a secure manner. In one example embodiment, the download_key is a pair of 64-bit values that are also fixed and are used to decrypt all DVB-CSA encrypted SBS-download content messages received by the CPE, though any appropriate key length and encryption algorithm may be employed. The same values are used for all CPE devices. These values are also permanently stored in the CPE in a secure manner. The content keys are the keys used for decryption of the encrypted content. Content keys are stored in the CPE in nonvolatile memory in a secure manner. The content keys are organized as an array, as shown previously in FIG. 1 for certain embodiments.

In accordance with certain embodiments, the content keys may be fixed in memory at the time of provisioning or manufacture. In other embodiments, as described above, the keys may be dynamically delivered at any suitable interval. Since there are many keys available for decryption, replacing the keys does not have to be done as often as in conventional cable systems. Likewise, the authorization table 22 containing the logical_channel, key_index and service_mask values can either be provided as a hardcoded table of constants or can be dynamically changed by use of transmission of channel authorization descriptors had in an EMM.

Hence, in certain embodiments, the content key can be changed on a regular basis by simply transmitting EMM messages containing new index value associations between the logical channel and the content decryption key pair. Electronic signatures can be employed to authenticate entitlement messages and software download messages. Each device can be addressed globally, individually or by group or service tier. Additionally, it is noted that there may be any number m+1 of content key pairs stored in table 12. The association between logical channels and content keys need not be 1:1. For example, multiple channels may be associated with a single key, and certain keys may not be associated with any channels at all at any given time. By providing an abundant library of keys, the decryption of content can be altered by changing the key index associated with a particular logical channel. This can be accomplished at any time for a single channel, multiple channels or all channels.

In accordance with certain embodiments, EMMs can be delivered through at least two independent mechanisms. The first delivery method, which is particularly useful for two-way devices, is through the use of the DOCSIS compliant cable modem integral to two-way CPE devices (e.g., set-top boxes). A second delivery method that can be provided for one-way devices and as an alternate method for two-way devices is in-band delivery, duplicated on each transport stream. The in-band delivery can for example closely follow the MPEG prescribed method.

A conditional access table (CAT), as defined in ISO/IEC 13818-1, can be carried in each transport stream and transmitted with the system SI data via DOCSIS delivery using UDP multicast. The CAT can contain one or more CA descriptors, as required by the standard. One of the CA descriptors can have the CASID of the system and the table also provides the EMM PID assignment within a particular transport stream. In this case, the CPE configures its transport processing elements to receive EMMs carried on this PID. For devices that receive SI through OOB methods such as DOCSIS, the EMM data can be carried on a multicast IP address and port specified in the CAT message, but the rest of the process and syntax remains unchanged from the in-band process.

The EMM can use, for example, the following format:

table_id: An 8-bit field that is set to 0x82 to identify this private table uniquely as a unit addressed EMMI or to 0x84 to identify this private table uniquely as a group addressed EMM.

section_syntax_indicator: A 1-bit field that is set to 0 to identify this table as a private section. The following bit set to zero signifies the data payload as private data.

address_hash: A 16-bit field carrying the hashed value of either the unit or group address, depending upon the table_id value. The entire 48-bit address field shall be condensed into a single 16-bit value using the 32-bit FNV-1 hash with xor-folding. This parameter is provided as a method to allow hardware filtering of EMMs and reduce CPE processor workload.

version: a 5 bit field that is monotonically increased for each unique EMM transmitted to a particular addressee or group, as applicable.

address: A 48-bit field carrying either the unit or group address, depending upon the table_id value. This is the same value used to create the address_hash.

The EMM message carries one or more MPEG format descriptors, which contain the actual entitlement payload. Every EMM has at least a signature data descriptor, which is always the last descriptor in an EMM. The inclusion of any descriptors in addition to the signature data descriptor is optional and there is no limitations regarding the number or order of the optional descriptors.

The EMM section is marked as an MPEG private section containing private data. For MPEC, each EMM section cannot exceed 4096 bytes in length. If the total message payload exceeds 4096 bytes, then multiple sections are transmitted and the payload spans sections, with the section_number and last_section_number indicating where a particular section fits in the sequence. In a multi-section EMM, each section is not terminated with a 4 byte CRC for that particular section. The last section in the message contains a CRC covering the composite payload. It is the responsibility of the receiving device to buffer a multi-section EMM in the correct sequential order and to remove the intervening section headers before EMM payload concatenation and composite CRC validation.

In accordance with certain embodiments, each CPE will initially be provisioned for services through reception of an EMM carrying at a minimum a group address assignment and FIPS assignment descriptor. The STB will receive an assignment to a group address carrying the "super group" address applicable to that CPE. The EMM carried in the "super group" typically carries only version and signature descriptors. The version descriptor includes other group addresses pointing to the key list and program authorization tables appropriate to that CPE based upon service tier, CPE type, region and/or locality.

The key data descriptor is a private descriptor providing the array of working keys used for decrypting content. Its format is defined for the illustrative embodiment in TABLE 2 below.

TABLE 2

| Syntax | No. of Bits | Identifier |
| --- | --- | --- |
| key_data_descriptor( ){ | | |
| descriptor_tag | 8 | uimsbf |
| descriptor_length | 32 | uimsbf |
| key_phase | 1 | bslbf |
| reserved | 7 | bslbf |
| key_count | 16 | uimsbf |
| for (i=0; i<key_count;i++) | | |
| { | 64 | uimsbf |
| content_key | | |
| } | | |
| } | | |

This table uses the following variables:

descriptor_tag: An 8-bit field that is set to 0xB2 to identify this descriptor uniquely as a key data descriptor.

descriptor_length: A 32-bit field specifying the number of bytes immediately following the descriptor_length field, up to the end of this descriptor.

key_phase: A single bit field that when set to a '1', indicates that the following array data is applied to packets carrying a transport_scrambling_control value of '11'. If the bit is cleared to a '0', it indicates that the following array data is applied to packets carrying a transport_scrambling_control value of '12'.

key_count: A 16-bit field containing the number of entries in the content key array content_key: A 64-bit value containing one DVB-CSA content key.

The signature data descriptor is a private descriptor providing the signature payload used for authentication of an EMM message. Its format is defined in TABLE 3 below.

TABLE 3

| Syntax | No. of Bits | Identifier |
| --- | --- | --- |
| signature_data_descriptor( ){ | | |
| descriptor_tag | 8 | uimsbf |
| descriptor_length | 32 | uimsbf |
| EMM_signature | 160 | uimsbf |
| } | | |

In TABLE 3, the following variables are used:

descriptor_tag: An 8-bit field that is set to 0xB3 to identify this descriptor uniquely as a signature data descriptor.

descriptor_length: A 32-bit field specifying the number of bytes immediately following the descriptor_length field, up to the end of this descriptor. For this particular descriptor, the value is defined to be 0x14.

EMM_signature A 160-bit field carrying the EMM message authentication code.

The program authorization descriptor is a private descriptor carrying the information used to provision the CPE to receive program content tiers. Its format for the example embodiment is defined in TABLE 4 below.

TABLE 4

| Syntax | No. of Bits | Identifier |
| --- | --- | --- |
| program_authorization_descriptor( ){ | | |
| descriptor_tag | 8 | uimsbf |
| descriptor_length | 32 | uimsbf |
| bouquet_id | 16 | uimsbf |
| reserved | 16 | uimsbf |
| channel_count | 16 | uimsbf |
| for (i=0; i<channel_count;i++) { | | |
| logical_channel | 16 | uimsbf |
| reserved | 16 | uimsbf |
| key_index | 16 | uimsbf |
| } | | |
| } | | |

TABLE 4 uses the following variables:

descriptor_tag: An 8-bit field that is set to 0xB5 to identify this descriptor uniquely as a program authorization descriptor.

descriptor_length: A 32-bit field specifying the number of bytes immediately following the descriptor_length field, up to the end of this descriptor.

bouquet_id: A 16-bit field carrying the index to the assigned channel bouquet as defined in the BAT table.

channel_count: A 16-bit field indicating the size of the channel array following this variable.

logical_channel: A 16-bit field specifying a logical channel number. The logical channel identified in this field is paired to the service_mask, carried in the service_mask descriptor, field as a record pair.

The data contained within array is stored in CPE nonvolatile memory. In the case where the array has not been received or is an entry for a particular channel otherwise missing, the default value is set to, for example, 0x00.

key_index: A 16-bit field specifying a pointer to an element in the data structure, stored in CPE nonvolatile memory containing the content keys for the service. Both the audio and video portions of a given service use the same content encryption key in this embodiment, but this should not be considered limiting.

The service mask descriptor is a private descriptor carrying the information used to change the attributes associated with the services provisioned in a CPE and stored in nonvolatile memory as part of the program authorization table structure. It is a subset of the program authorization descriptor. Its format, for the example embodiment is defined in TABLE 5 below.

TABLE 5

| Syntax | No. of Bits | Identifier |
| --- | --- | --- |
| service_mask_descriptor( ){ | | |
| descriptor_tag | 8 | uimsbf |
| descriptor_length | 32 | uimsbf |
| item_count | 16 | uimsbf |
| for (i=0; i<item_count;i++) | | |
| { | 16 | uimsbf |

TABLE 5-continued

| Syntax | No. of Bits | Identifier |
|---|---|---|
| logical_channel service_mask } } | 16 | uimsbf |

TABLE 5 uses the following variables:
descriptor_tag: An 8-bit field that is set to 0xBB to identify this descriptor uniquely as a service mask descriptor.
descriptor_length: A 32-bit field specifying the number of bytes immediately following the descriptor-length field, up to the end of this descriptor.
item_count: A 16-bit field indicating the number of entries in the list following this variable.
logical_channel: A 16-bit field specifying a logical channel number. The logical channel identified in this field will be paired to the subsequent service_mask field as a record pair
service_mask: A 16-bit field containing a binary mask indicating attributes associated with the corresponding logical channel. Service Mask Bits are defined in accordance with TABLE 6 below.

TABLE 6

| Position | Mask Bit Definition (Set) |
|---|---|
| 0x0000 | Clears all previous mask bits |
| 0x0001 | Channel Unauthorized |
| 0x0002 | Macrovision Activated |
| 0xFFFC to 0x0004 | Reserved |

The data contained within this array is stored in CPE nonvolatile memory. In the case where the array has not been received or is an entry for a particular channel otherwise missing, the default value can be set to 0x00.

The BAT descriptor is a private descriptor carrying the information necessary to provision the CPE to receive program content tiers by changing the value of the bouquet_id variable stored within the CPE nonvolatile memory as part of the program authorization table structure. It is a subset of the program authorization descriptor. Its format is defined in TABLE 7 below.

TABLE 7

| Syntax | No. of Bits | Identifier |
|---|---|---|
| bouquet_descriptor( ){ descriptor_tag descriptor_length bouquet_id } | 8 32 16 | uimsbf uimsbf uimsbf |

TABLE 7 uses the following variables:
descriptor_tag: An 8-bit field that can be set to 0xBC to identify this descriptor uniquely as a bouquet descriptor.
descriptor_length: A 32-bit field specifying the number of bytes immediately following the descriptor_length field, up to the end of this descriptor.
bouquet_id: A 16-bit field carrying the index to the assigned channel bouquet as defined in the BAT table.

Thus, a receiver device consistent with certain embodiments that receives and decrypts digital cable and satellite television signals has a receiver that tunes and demodulates the television signal into a digital transport stream. A decrypter decrypts the digital transport stream using a pair of decryption keys. A first decryption key array stored in a first storage location forming a part of the receiver device, and a second key array stored in a second storage location forming a part of the receiver device, the first and second key arrays representing ordered pairs of keys. An authorization table is stored in a third storage location forming a part of the receiver device, the authorization table containing a mapping, wherein each ordered pair of decryption keys corresponds to a different one of a plurality of Multichannel Video Program Distributors (MVPD). Any of the first, second and third storage locations may or may not be a part of a single memory device.

Another receiver device that receives and decrypts digital cable or satellite television signals has a receiver that tunes and demodulates the television signal into a digital transport stream. A decrypter decrypts the digital transport stream using a pair of decryption keys comprising an even key and an odd key, wherein the even and odd keys are alternately used by the decrypter for decryption during successive key epochs. A key table is stored in a first secure persistent storage medium forming a part of the receiver device, the key table containing a library of a plurality of even keys and an associated plurality of odd keys forming key pairs that are indexed with a key identifier. An authorization table is stored in a second secure persistent storage medium forming a part of the receiver device, the authorization table containing a mapping of a logical channel to a key pair identifier for each of a plurality of logical channels. At least a portion of contents of the authorization table is received in a first encrypted private Entitlement Management Message (EMM) message in order to establish the mapping of a logical channel to a key pair identifier. In response to a user input for selecting one of the plurality of logical channels in the authorization table a key index associated with the selected logical channel is identified, and the key index is used to select a key pair from the key table for use by the decrypter in decrypting the transport stream.

A method, consistent with certain embodiments, of enabling a receiver device to decrypt digital satellite or television signals involves storing a plurality of key pairs in a key table in secure persistent storage in the receiver device, with each key pair corresponding to a key index; receiving a first private Entitlement Management Message (EMM) at the receiver device containing a mapping of at least one logical channel to a key index identifying a key pair associated used for decrypting the logical channel; storing the mapping in an authorization table along with information indicating whether or not the receiver device is authorized to receive the logical channel; receiving a command to tune to a specified logical channel; referencing the authorization table to determine if the receiver device is authorized to tune to the tuning the receiver device to the specified logical channel; if the receiver device is authorized to tune to the specified logical channel, tuning to the specified channel and demodulating a digital transport stream; referencing the authorization table to retrieve the key pair mapped to the logical channel; and decrypting the transport stream using the key pair, with one key of the key pair being used at a time.

Application to Packaged Media

Once the initial concept of providing the multiple levels of indirection as described above is understood, application of similar technology to packaged media can be undertaken. Consider, for example, the illustration depicted in FIG. 6. In this embodiment, a media player 202 incorporates a storage device such as a ROM or other memory device that is contained preferably in a physically secured package to prevent reading or tampering with a key table 206 stored therein. Such storage incorporates key table 206 that utilizes a very large number of decryption keys (potentially many thousands or even many millions of such keys—preferably at least about 4,000,000 such indexed keys) that are indexed by an index reference as depicted. There can be duplicate keys in multiple index locations, or each indexed storage location can contain an unique decryption key.

When a packaged media element 210 such as a DVD or blue ray media is engaged in the media player device 202, it begins reading the media 210 at a designated location, where it will find a packet such as key index packet 214 or other storage unit containing an index that points to a key in key table 206. At that point, the identified key is selected from the key table and is used to decrypt data packets from that point forward. In certain embodiments, a single key may be used for all of the content of the media 210, while in other embodiments, decryption may proceed along the stream of packets 218 until a new key index packet 222 is encountered. As depicted, all packets including the new key index packet 222 encountered during period T1 is decrypted using the key determined by key index packet 214. In other embodiments, all key index packets may be specially designated and encrypted using the same encryption key (e.g., a pre-designated default key—e.g., the default key may be a public key used in conjunction with a private key) or may be provided in the clear. So long as the keys are securely stored with physical protection to the key table, a hacker will be thwarted in attempts at decrypting and decoding the content. The first key index packet can be encrypted using a pre-designated default key, such as a public key using a securely stored private key, or the key to the first key index packet may by packaged along with the packaged medium and be entered by the user.

As shown in media player device 202, the player device, of course, incorporates a media reader 224 suitable for reading the media 210 and a decrypter 226 that decrypts using keys obtained from key table 206. A decoder 228 then produces decoded digital content that is converted to analog or played back at output 230

Another embodiment is depicted in FIG. 7, in which a key index table 244 is stored on the packaged media 240. In such an embodiment, the key index table is read in order to identify which key index is to be used for any given segment of the content. That index is then used as an entry point in the key table 206 to identify an appropriate key for decryption. The key index table can be encrypted using a pre-designated default key, such as a public key using a securely stored private key, or the key may by packaged along with the packaged medium and be entered by the user.

Those skilled in the art will appreciate upon consideration of the present embodiments that packaged media may be encrypted using a single key or multiple keys. Moreover, when multiple keys are used, such keys may be encrypted using multiple keys or a single key. In a variation of this embodiment, the packaged media 210 is also provided with an index for use in decryption of the first key. Or, in another embodiment, the packaged media may include an index for decryption of all keys, or multiple levels of encryption of both keys and content may be used. In other embodiments, for example, a key table present in the packaged media can be used to identify keys used to decrypt the key index packets that are used to decrypt the actual content. In still other embodiments, the key index can identify a starting and ending point for use of a new key, and such starting and ending points may not be immediately after the new key is encountered in the data stream. Many variations are possible without departing from embodiments consistent with the present invention.

Figure 8:
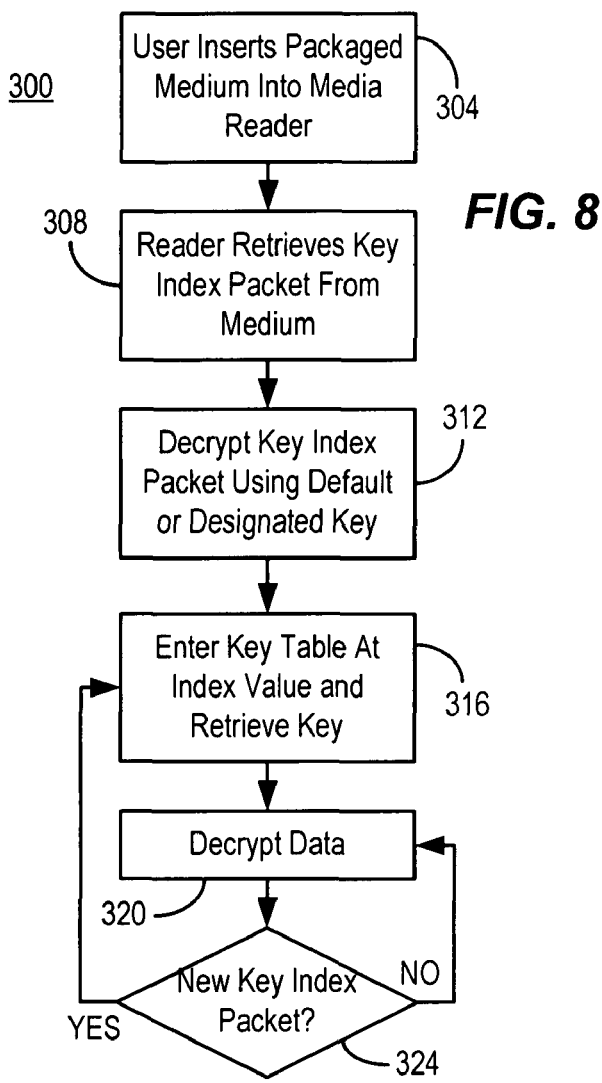
FIG. 8 is a flow chart illustrating an example process consistent with certain embodiments such as that of FIG. 6.

The embodiment shown in FIG. 6 can be utilized generally in conjunction with the process 300 depicted in FIG. 8. In this process, the user inserts the packaged medium into the media reader at 304 and the reader retrieves the first key index packet from the medium at 308. At 312, the key index packet is decrypted, for example using a default or public key, and the key table is entered at 316 to ascertain the key value associated with the retrieved key index. Data can then be decrypted at 320 until such time as a new key index packet is encountered at 324 (or other specified location designating a key change). At this point, control returns to 316 where the key table is again entered to obtain a new key so that decryption can continue at 320.

Figure 9:
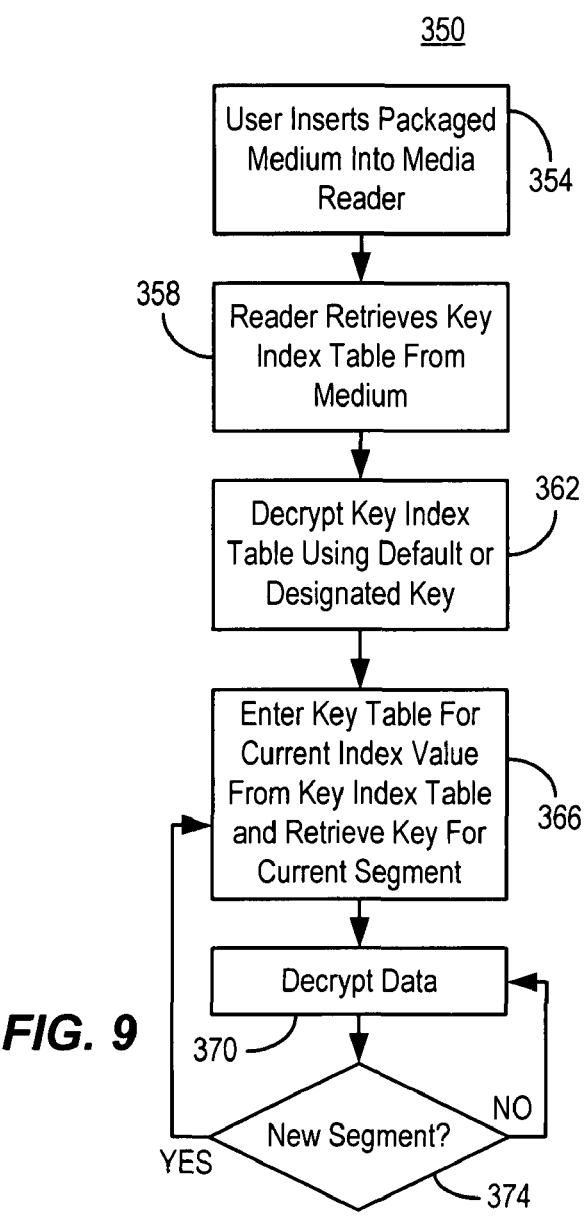
FIG. 9 is a flow chart illustrating an example process consistent with certain embodiments such as that of FIG. 7.

The embodiment shown in FIG. 7 can be utilized generally in conjunction with the process 350 depicted in FIG. 9. In this process, the user inserts the packaged medium into the media reader at 354 and the reader retrieves the key index table from the medium at 358. At 362, the key index table is decrypted, for example using a default or public key, and the key table is entered at 366 to ascertain the key value associated with the retrieved key index to be used for the current segment of content. Data can then be decrypted at 370 until such time as a new segment designated in the key table is encountered at 374 (or other specified location designating a key change). At this point, control returns to 366 where the key table is again entered to obtain a new key so that decryption can continue at 370.

In an alternative embodiment consistent with the present invention, the key table containing the 65536 key pairs has its context redefined to be hash pairs or even a combination of key and hash pairs. In this scenario, there is either a very secret and hidden root key that is embedded in the hardware of the decoder, transport ICs or their composite and the values retrieved from the table, as previously described, are hashed against the root key. This way, there is never any transmission of a single value that can be used to unlock content in the decryption element. Successful decryption requires the root key, the hash value and the particular hash algorithm used to combine the two values to create a derivative content key.

In present systems, a root key can be hidden within a cryptographically secure IC or equivalent area of the decoder, transport ICs or their composite. This functional block can be fed the hash value from the table and internally perform the hash without ever exposing the root key, kept securely within the block. The resultant composite content key can then be applied to the decryption element. In many cases, this too is also contained within the secure block so that no key is ever exposed to be viewed or otherwise compromised.

As indicated previously, a table could contain values that can be arbitrarily hashed together to form many permutations of content keys (4,294,967,296 possible combinations for a 65,536 entry table). The indication of the values to hash come from a simple extension to the key table to add an additional column for a second key or hash value. Hence, in accordance with embodiments consistent with the present invention, a hash value can be considered a key for purposes of storage in the key table, and the key table can contain either hash pairs or a combination of keys and hash pairs or simply keys, without limitation.

Many variations in these processes can be envisioned by those skilled in the art upon consideration of the present teachings. For example, a given medium or portion of a medium can contain be encrypted using a single key or many keys. Moreover, multiple key tables can be provided within the hardware, with key indices alternately pointing to different keys in different tables. In other embodiments, different retail copies of the same content can utilize different sets of keys. Additionally, certain keys or key tables can be variable or dynamic and downloaded on demand from a key source via the Internet upon demand from the medium. In such cases, the medium can designate which key table is to be downloaded without identifying the actual keys being used for decryption of the content. Moreover, keys may be stored on the media and used in place of certain or all of the keys in the key table of the hardware device.

Thus, in certain embodiments of a player device that receives and plays content stored on packaged media, the player device has a media reader that receives a packaged media to read digital data stored thereon. The player device has a secure persistent storage device storing a key table containing a plurality of keys indexed by an index. A decrypter decrypts the digital data stored on the packaged media using at least one of the encryption keys referenced by a key index stored on the packaged media. A decoder decodes the decrypted digital data stored on the packaged media and provides the decoded data as an output.

In certain embodiments the key index is embedded in a key index packet forming part of a stream of data from the packaged media. In certain embodiments the key index is stored in a table on the packaged media. In certain embodiments the key index stored in on the packaged media is encrypted using a pre-defined default key. In certain embodiments the key index stored on the packaged media is encrypted using a key indexed in the packaged media. In certain embodiments the key table contains at least approximately 4,000,000 keys.

A method of enabling a media player device decrypt packaged media consistent with certain embodiments involves storing a plurality of keys in a key table in secure persistent storage in the media player device, with each key corresponding to a key index; receiving a packaged media device for playback; reading a key index from the packaged media; using the key index to identify a key from the key table; and decrypting data using the key found in the key table. In certain embodiments reading the key index involves reading a key index embedded in a stream of content, and upon reading a new key index, changing to a new decryption key defined by the new key index.

In certain embodiments, an electronic storage device stores content data readable by an electronic media reader device, the electronic storage device containing: a key index that stores a key index to be used for decryption of at least a portion of the content stored on the electronic storage device; the key index referencing a decryption key stored in the electronic media reader device in a secure persistent storage location that stores a key table containing a plurality of keys indexed by indices; a plurality of content data stored on the electronic storage device in encrypted form, wherein the content data is encrypted by an encryption key corresponding to the key indexed by the key index. In certain embodiments the key index is embedded in a key index packet forming part of a stream of data from the packaged media. In certain embodiments the key index is stored in a table on the packaged media. In certain embodiments the key index stored in on the packaged media is encrypted using a pre-defined default key. In certain embodiments the key index stored on the packaged media is encrypted using a key indexed in the packaged media. In certain embodiments the key index is embedded in a stream of the content, and a new key index is further embedded in the stream of content, and wherein the content is encrypted using the a new key after the new key appears in the content.

In certain embodiments, the plurality of keys corresponding to the key index can be embodied as either hash pairs or a combination of keys and hash pairs.

Those skilled in the art will recognize, upon consideration of the above teachings, that certain of the above exemplary embodiments are based upon use of a programmed processor.

However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A player device that receives and plays content stored on portable packaged media, the player device comprising:
    a secure persistent storage device within the player device storing a key table containing a plurality of encryption keys, each encryption key indexed by a key index;
    a media reader within the player device receiving a portable packaged medium when said portable packaged medium is physically inserted into the media reader by a user for playback of the digital content stored on the portable packaged medium; the media reader reading a first encrypted key index from the portable packaged medium, wherein the first encrypted key index is embedded in a key index packet forming part of a stream of data from the portable packaged medium, and wherein key indices stored on the packaged media are encrypted using a pre-defined default key or public key;
    a decrypter within the player device programmed to:
        decrypt the first encrypted key index to obtain first key index using the pre-defined default key or public key;
        decrypt the digital content stored on the portable packaged medium using a first encryption key identified by the first key index for a time period until a second encrypted key index is encountered on the portable packaged medium;
        upon subsequently encountering and reading the second encrypted key index, decrypt the second encrypted key index to obtain second key index using the pre-defined default key or public key; change to a second encryption key defined by the second key index after retrieving the second encryption key from the key table using the second key index;

decrypt the digital content encountered subsequent to encountering and reading the second encrypted key index by using the second encryption key found in the key table for a time period until another key index is encountered on the portable packaged medium;

where the secure persistent storage device stores the key table in a mechanically and electrically secured package that prevents reading the key table stored therein except by the decrypter; and a decoder within the player device that decodes the decrypted digital content stored on the portable packaged medium and provides the decoded digital data as an output.

2. The player device according to claim 1, wherein the key index is stored in a table on the portable packaged medium where the key index comprises a memory address or a memory address offset.

3. The player device according to claim 1, wherein the key table contains at least approximately 4,000,000 keys.

4. The player device according to claim 1, wherein the plurality of encryption keys indexed by the key index comprises either hash pairs or a combination of keys and hash pairs.

5. A method of enabling a portable packaged media player device to decrypt portable packaged media, comprising:

storing a plurality of encryption keys in a key table in a secure persistent storage device within the portable packaged media player device, each encryption key is indexed by a key index;

at a media player residing within the media player device, upon receiving a portable packaged medium by insertion of said medium by a user for playback of the digital content stored on the portable packaged medium, reading a first encrypted key index from the portable packaged medium, wherein the first encrypted key index is embedded in a key index packet forming part of a stream of data from the portable packaged medium, and wherein the key indices stored on the packaged media are encrypted using a pre-defined default key or public key;

decrypting the first encrypted key index to obtain first key index using the pre-defined default key;

at a decrypter, decrypting the digital content stored on the portable packaged medium using a first encryption key identified by the first key index for a time period until a second key index is encountered on the portable packaged medium;

upon subsequently encountering and reading the second encrypted key index, decrypting the second encrypted key index to obtain second key index using the pre-defined default key or public key; changing to a second encryption key defined by the second key index after retrieving the second encryption key from the key table using the second key index;

decrypting the digital content encountered subsequent to encountering and reading the second encrypted key index by using the second encryption key found in the key table for a time period until another key index is encountered on the portable packaged medium;

where the secure persistent storage device stores the key table in a mechanically and electrically secured package that prevents reading the key table stored therein except by the decrypter; and decoding the decrypted data at a decoder residing within the media player device.

6. The method according to claim 5, wherein the key index is stored in a table on the portable packaged medium where the key index comprises a memory address or a memory address offset.

7. The method according to claim 5, wherein the key table contains at least approximately 4,000,000 keys.

8. The method according to claim 5, wherein reading the key index comprises reading a key index embedded in a stream of content, and upon reading a new key index, changing to a new decryption key defined by the new key index.

9. The method according to claim 5, wherein the plurality of encryption keys corresponding to the key index comprises either hash pairs or a combination of keys and hash pairs.

10. A non-transitory computer readable medium storing computer executable instructions that, when executed by one or more programmed processors of a media player device, cause the one or more programmed processors to perform the following actions:

storing a plurality of encryption keys in a key table in secure persistent storage device within the media player device, each encryption key is indexed by a key index;

upon receiving a portable packaged medium within the media player device by insertion by a user for playback of the digital content stored on the portable packaged medium, reading a first encrypted key index from the portable packaged medium, wherein the first encrypted key index is embedded in a key index packet forming part of a stream of data from the portable packaged medium, and wherein the key indices stored on the packaged media are encrypted using a pre-defined default key or public key;

decrypting the first encrypted key index to obtain the first key index using a pre-defined default key or public key;

at a decrypter within the media player device, decrypting the digital content stored on the portable packaged medium using a first encryption key identified by the first key index for a time period until a second key index is encountered on the portable packaged medium;

upon subsequently encountering and reading the second encrypted key index, decrypting the second encrypted key index to obtain second key index using the pre-defined default key or public key; changing to a second encryption key defined by the second key index after retrieving the second encryption key from the key table using the second key index;

decrypting the digital content encountered subsequent to encountering and reading the second encrypted key index by using the second encryption key found in the key table for a time period until another key index is encountered on the portable packaged medium;

where the secure persistent storage device stores the key table in a mechanically and electrically secured package that prevents reading the key table stored therein except by the decrypter; and decoding the decrypted data at a decoder residing within the media player device.

11. The non-transitory computer readable medium according to claim 10, wherein the plurality of encryption keys corresponding to the key index comprises either hash pairs or a combination of keys and hash pairs.

12. The non-transitory computer readable medium according to claim 10, where the key index comprises a memory address or a memory address offset.

* * * * *